(12) United States Patent
Choi et al.

(10) Patent No.: US 9,864,179 B2
(45) Date of Patent: Jan. 9, 2018

(54) IRIS RECOGNITION LENS SYSTEM

(71) Applicant: Sekonix Co., Ltd., Dongducheon-Si (KR)

(72) Inventors: Soon Chul Choi, Namyangju (KR); Chang S. Jegal, Bucheon-Si (KR); Yang S. Kim, Bucheon-Si (KR); Young J. Lee, Yangju-Si (KR)

(73) Assignee: SEKONIX CO., LTD., Pyeonghwa-ro, Dongducheon-si (KR)

( * ) Notice: Subject to any disclaimer, the term of this patent is extended or adjusted under 35 U.S.C. 154(b) by 0 days.

(21) Appl. No.: 14/684,029

(22) Filed: Apr. 10, 2015

(65) Prior Publication Data
US 2016/0187631 A1 Jun. 30, 2016

(30) Foreign Application Priority Data
Dec. 30, 2014 (KR) .......................... 10-2014-0193657

(51) Int. Cl.
| | |
|---|---|
| *G02B 17/08* | (2006.01) |
| *G02B 17/00* | (2006.01) |
| *G02B 3/02* | (2006.01) |
| *G02B 13/00* | (2006.01) |
| *G02B 13/18* | (2006.01) |
| *G02B 13/24* | (2006.01) |

(Continued)

(52) U.S. Cl.
CPC .......... *G02B 17/0808* (2013.01); *G02B 3/02* (2013.01); *G02B 13/0095* (2013.01); *G02B 13/06* (2013.01); *G02B 13/18* (2013.01); *G02B 13/24* (2013.01); *G02B 17/0856* (2013.01); *G02B 17/023* (2013.01)

(58) Field of Classification Search
CPC ...... G02B 13/06; G02B 17/023; G02B 17/08; G02B 17/0808; G02B 17/0856; G02B 17/086; G02B 23/02; G02B 23/10; G02B 27/646; G02B 3/02; G02B 3/04; G02B 13/0095; G02B 3/18; G02B 3/24; G11B 7/1374; G11B 2007/13725
USPC ................ 359/366, 503, 646, 708, 712–717, 359/725–728, 736; 348/144; 362/516
See application file for complete search history.

(56) References Cited

U.S. PATENT DOCUMENTS

| | | | | |
|---|---|---|---|---|
| 3,064,526 | A | * 11/1962 | Lindsay | ................. G02B 15/00 |
| | | | | 359/366 |
| 3,897,133 | A | * 7/1975 | Warner | ................. G02B 7/002 |
| | | | | 359/365 |

(Continued)

*Primary Examiner* — Loha Ben
(74) *Attorney, Agent, or Firm* — Locke Lord LLP; Christopher J. Capelli; Judy R. Naamat

(57) ABSTRACT

An iris recognition lens system including a first lens and a second lens disposed on an optical axis and sequentially from an object to take an image of an iris and a pupil. A front part of the first lens includes a reflecting area in a central portion and a transmitting area in a circumferential portion. A rear part of the first lens includes a concave transmitting area in a central portion and a reflecting area in a circumferential portion. The second lens is disposed at a rear of the transmitting area in the central portion of the rear part of the first lens. A plurality of reflecting areas and a plurality of transmitting areas are provided in a single lens in order to reduce the length of the lens and increase a focal length, thereby reducing the length of the entire iris recognition lens system.

12 Claims, 9 Drawing Sheets

(51) Int. Cl.
*G02B 13/06* (2006.01)
*G02B 17/02* (2006.01)

(56) References Cited

U.S. PATENT DOCUMENTS

| | | | | |
|---|---|---|---|---|
| 4,061,420 A | * | 12/1977 | Kaprelian | G02B 17/0808 359/729 |
| 6,449,103 B1 | * | 9/2002 | Charles | G02B 13/06 359/366 |
| 8,310,769 B2 | * | 11/2012 | Mizusawa | G02B 17/08 359/725 |
| 8,730,592 B2 | * | 5/2014 | Mizusawa | G02B 13/06 359/727 |
| 2014/0267722 A1 | * | 9/2014 | Riot | G02B 23/02 348/144 |

\* cited by examiner

IRIS RECOGNITION LENS SYSTEM

CROSS REFERENCE TO RELATED APPLICATION(S)

This application claims the benefit of Korean Patent Application No. 10-2014-0193657, filed on Dec. 30, 2014, which is hereby incorporated by reference in its entirety into this application.

BACKGROUND OF THE INVENTION

Field of the Invention

The present invention generally relates to an iris recognition lens system. More particularly, the present invention relates to an iris recognition lens system in which a single lens has a plurality of reflecting areas and a plurality of transmitting areas in order to reduce the length of the lens and increase a focal length, thereby reducing the length of the entire iris recognition lens system.

Description of the Related Art

Iris recognition is a technology for taking an image of an iris through a lens, encoding the image according to a pattern, storing the encoded image, and comparing and determining whether an input image is identical with the stored image. The accuracy of the iris recognition is regarded higher than that of fingerprint recognition.

An iris recognition lens system using this technology is provided as a mobile product. Since the iris must be recorded at a large size, the use of a lens having a long focal length is required, thereby increasing the thickness of the lens system. When a lens having a short focal length is used, it is very uncomfortable since the eye must be placed close to the lens to take the image of the iris.

As an example of the related art, U.S. Pat. No. 7,542,219 disclosed a lens system including six lenses, in which a focal length f is 67.74 mm, a total optical track length (TTL) is 68.53 mm, and TTL/f=1.01. In this case, the ratio of the TTL to the focal length is greater than one. When the focal length is scaled to about 14 mm, the total track length is 14.16 mm, which is inapplicable to thin smartphones.

In general, the size of an iris ranges from colt φ12 to φ13 mm. When a focal length is 14 mm, it is possible to obtain an accurate image of an iris at an eye-to-lens distance of 250 mm where the size of the iris image ranges 0.8 to 0.9 mm.

In addition, U.S. Pat. No. 6,980,372 relates to a technology of realizing superior performance using three lenses. Referring to embodiment 1 of this related art, when a focal length is normalized at 1 mm, a TTL is 1.195 mm. When the focal length is converted to 3 min for actual conditions, the TTL is about 3.6 mm, which is applicable to smartphones. However, when an eye is photographed at an eye-to-lens distance of 250 mm using this lens, an iris image has a very small size ranging from 0.15 to 0.16 mm, thereby making it impossible to obtain an accurate iris image.

Since the eye-to-lens distance must be about 50 mm for the iris image size ranging from 0.8 to 0.9 mm, the imaging operation is very uncomfortable, and it is difficult to take an accurate image.

The information disclosed in the Background of the Invention section is only for the enhancement of understanding of the background of the invention, and should not be taken as an acknowledgment or any form of suggestion that this information forms a prior art that would already be known to a person skilled in the art.

SUMMARY OF THE INVENTION

Accordingly, the present invention has been made keeping in mind the above problems occurring in the related art, and the present invention is intended to propose an iris recognition lens system in which a single lens has a plurality of reflecting areas and a plurality of transmitting areas in order to reduce the length of the lens and increase a focal length, thereby reducing the length of the entire iris recognition lens system.

In order to achieve the above object, according to one aspect of the present invention, there is provided an iris recognition lens system including: a first lens and a second lens disposed on an optical axis and sequentially from an object to take an image of an iris and a pupil. A front part of the first lens includes a reflecting area in a central portion and a transmitting area in a circumferential portion. A rear part of the first lens includes a concave transmitting area in a central portion and a reflecting area in a circumferential portion. The second lens is disposed at a rear of the transmitting area in the central portion of the rear part of the first lens.

The reflecting area in the front part of the first lens may he concave in a direction toward the object The inner diameter of the reflecting area in the rear part of the first lens may he greater than the outer diameter of the transmitting area in the rear part of the first lens.

The transmitting area and the reflecting area in the rear part of the first lens may be connected to each other via an inclined surface extending from an inner diameter of the reflecting area to an outer diameter of the transmitting area. The inclined surface may be shaped to converge forward about the optical axis.

The inclined surface may he provided with a light-blocking means. The inclined surface may have a stepped shape.

In light bundles emitted from the object on the optical axis, a ray of light propagating at a height corresponding to 90% of an effective diameter may be directed satisfying the following relationship: |ang3|>|ang4|×2, where ang3 indicates an angle of light reflected from the reflecting area in the rear part with respect to the optical axis, and ang4 indicates an angle of light reflected from the reflecting area in the front part with respect to the optical axis.

A relationship: TTL/f<0.50 may be satisfied, where TTL is a total optical track length (TTL) or a length from a summit of a front surface of the first lens to an imaging surface, and f is a focal length.

The first lens and the second lens may be formed of a plastic material.

The iris recognition lens system may further include one to three rear lenses arranged on the optical axis and sequentially at a rear of the second lens. The rear lenses may be formed of a plastic material, at least one surface of the rear lenses forming an aspheric lens.

According to the present invention as set forth above, a single lens has a plurality of reflecting areas and a plurality of transmitting areas in order to reduce the length of the lens and increase a focal length thereby reducing the length of the entire iris recognition lens system. The angle of light with respect to the optical axis is controlled to improve imaging, thereby improving the performance of the optical system. A small but high-definition iris recognition lens system is provided.

BRIEF DESCRIPTION OF THE DRAWINGS

The above and other objects, features and advantages of the present invention will be more clearly understood from the following detailed description when taken in conjunction with the accompanying drawings, in which.

DETAILED DESCRIPTION OF THE INVENTION

Figure 1A:
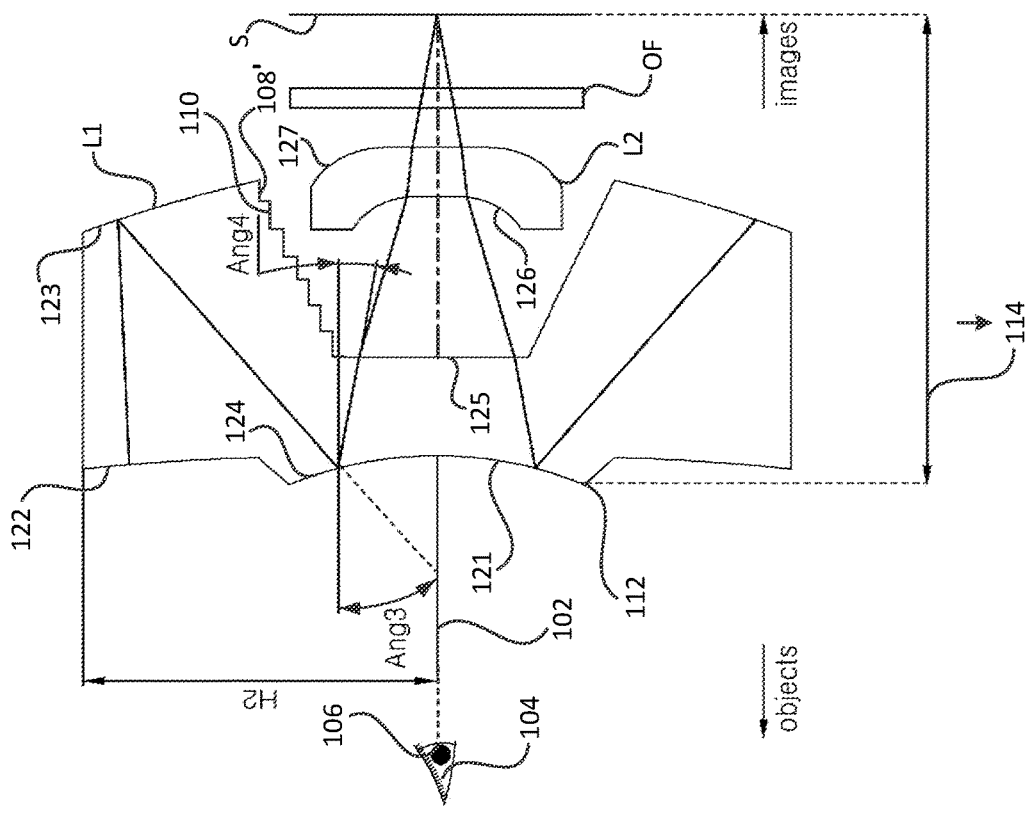
FIG. 1A is a schematic view illustrating an iris recognition lens system having a stepped inclined surface according to the present invention.

The present invention relates to an iris recognition lens system of which the total optical track length (TTL), i.e. the length from the summit of the front surface of a lens through which the image of an iris and a pupil are photographed to an imaging surface, is shorter than the focal length f. More particularly, the present invention relates to an iris recognition lens system in which a single lens has a plurality of reflecting areas and a plurality of transmitting areas in order to reduce the total length of the lens and increase the focal length, thereby reducing the length of the entire iris recognition lens system.

Reference now be made in greater detail to the present invention in conjunction with the accompanying drawings.

An aspect of the present invention provides an iris recognition lens system in which a first lens L1 and a second lens L2 are arranged on an optical axis 102 and sequentially from an object to take an image of an iris 104 and a pupil 106. The front part of the first lens has a reflecting area in central portion and a transmitting area in the circumferential portion, and the rear part of the first lens has a concave transmitting area in the central portion and a reflecting area in the circumferential portion. The second lens is positioned at the rear of the central transmitting area of the rear part of the first lens.

The reflecting areas and the transmitting areas are provided in the front part and the rear part of the first lens. More specifically, the reflecting areas are formed in the central portion of the front part and the circumferential portion of the rear part of the first lens, whereas the transmitting areas are formed in the circumferential portion of the front part and the central portion of the rear part of the first lens.

This geometry of the first lens reduces the length of the entire first lens system while increasing a focal length of the iris recognition lens system, thereby enabling a small iris recognition lens system to be provided.

A light bundle from an object on the optical axis first passes through the circumferential transmitting area (second surface 122) of the front part of the first lens L1, is reflected from the circumferential reflecting area (third surface 123) of the rear part of the first lens, is reflected again from the central reflecting area (fourth surface 124) of the front part of the first lens, and subsequently passes through the central transmitting area (fifth surface 125) of the rear part of the first lens, exiting the first lens. Thereafter, the light bundle propagates through the second lens L2 (sixth and seventh surfaces, 126 and 127, respectively), thereby forming an image on the imaging surface S.

The second lens is disposed at the rear of the transmitting area of the rear part of the first lens in order to compensate for the performance of the first lens.

This structure reduces the length of the entire lenses and increases the focal length of the iris recognition lens system, thereby improving the iris recognition lenses. This structure also enables a small recognition lens system to be provided, such that a high-performance iris recognition lens system is applicable to small electronics such as smartphones.

The reflecting area of the front part of the first lens is concave in the direction toward the object such that light reflected from the circumferential reflecting area of the rear part of the first lens is reflected again and converges, thereby increasing the focal length of the first lens and facilitating the imaging.

It is preferable that the inner diameter of the circumferential reflecting area of the rear part of the first lens is greater than the outer diameter of the central transmitting area of the rear part of the first lens, and that the inner diameter of the circumferential reflecting area is connected to the outer diameter of the central transmitting area via an inclined surface 108. This structure allows the first lens to be manufactured by injection molding.

The transmitting area of the rear part of the first lens is formed concave such that the inclined surface converges forward about the optical axis.

This geometry prevents light from the circumferential transmitting area (second surface) of the front part of the first lens from arriving at a sensor directly through the transmitting area (fifth surface) of the rear part of the first lens.

The inclined surface is coater with a light-blocking means 110, such as a black lacquer or a black bond, in order to prevent light that has passed through the circumferential transmitting area of the part of the first lens from passing through the inclined surface. This configuration serves to prevent unnecessary light such as a flare.

The inclined surface may stepped, shown as stepped surface 108' in FIG. 1A, in order to improve the light-blocking ability, thereby improving imaging performance.

In particular, the iris recognition lens system according to the present invention is characterized in that, in light bundles emitted from the object on the optical axis, a ray of light propagating at a height corresponding to 90% of the effective diameter is directed satisfying the following relationship: $|ang3|>|ang4|\times 2$, where ang3 indicates the angle light reflected from the reflecting area of the rear part with respect to the optical axis, and ang4 indicates the angle of light reflected from the reflecting area of the front part respect to the optical axis.

Figure 1:
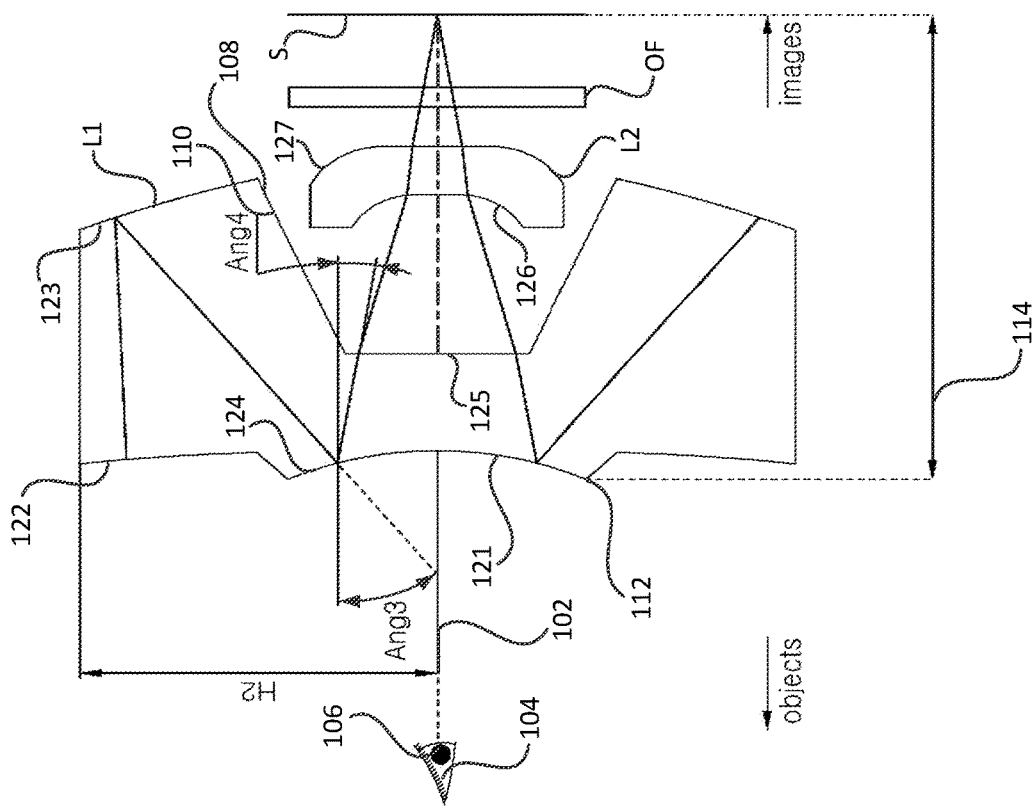
FIG. 1 is a schematic view illustrating an iris recognition lens system according to the present invention.

Specifically, as illustrated in FIG. 1, in a light bundle from among the light bundles emitted from the object on the optical axis, a ray of light propagating at a height H2 corresponding to 90% of the effective diameter passes through the circumferential transmitting area (second surface) of the front part of the first lens, is reflected from the circumferential reflecting area (third surface) of the rear part of the first lens, is directed to and reflected from the central reflecting area (fourth surface) of the front part of the first lens, and subsequently passes through the central transmitting area (fifth surface) of the rear part of the first lens.

In this case, the ang3 indicates the angle of the light reflected from the third surface with respect to the optical axis, and the ang4 indicates the angle of the light reflected from the fourth surface with respect to the optical axis. The angle ang3 is set at least two times the angle ang4. When these conditions are satisfied, a long focal length can be realized.

The iris recognition lens system according to the present invention is configured such that the length from the summit 112 of the front surface 121 of the first lens to the imaging surface, i.e. the total optical track length (TTL) 114, and the focal length f satisfy the following relationship: TTL/f<0.50, thereby enabling the focal length to be significantly greater than the length of the entire lens system. The long focal length obtains the unique function of an iris recognition lens while reducing the length of the entire lens system, thereby enabling a high-performance iris recognition lens system.

In addition, the second lens disposed at the rear of the central transmitting area of the rear part of the first lens. One to three rear lenses may be disposed on the optical axis at the rear of the second lens in order to further improve imaging performance.

The rear lens may be fitted together with the second lens into the concave portion in the central transmitting area of the rear part of the first lens. More specifically, the shape of the rear lens may correspond to the shape of the inclined surface such that the rear lens is engaged with the inclined surface, thereby further reducing the length of the lens system considering the focal length.

In addition, it is preferable that the first lens and the second lens used in this iris recognition lens system are formed of a plastic material. It is also preferable that the rear lens is formed of a plastic material.

At least one surface of the rear lens forms an aspheric lens, thereby improving the imaging performance of the circumferential portion.

As described above, according to the present invention, a single lens has a plurality of transmitting areas and a plurality of the reflecting areas in order to reduce the length of the entire lens system while increasing the focal length. The angle of light with respect to the optical axis is controlled to facilitate the imaging. The performance of the optical system is improved, and the size of the entire optical system is reduced.

Exemplary embodiments of the present invention will described below.

First Embodiment

Figure 2:
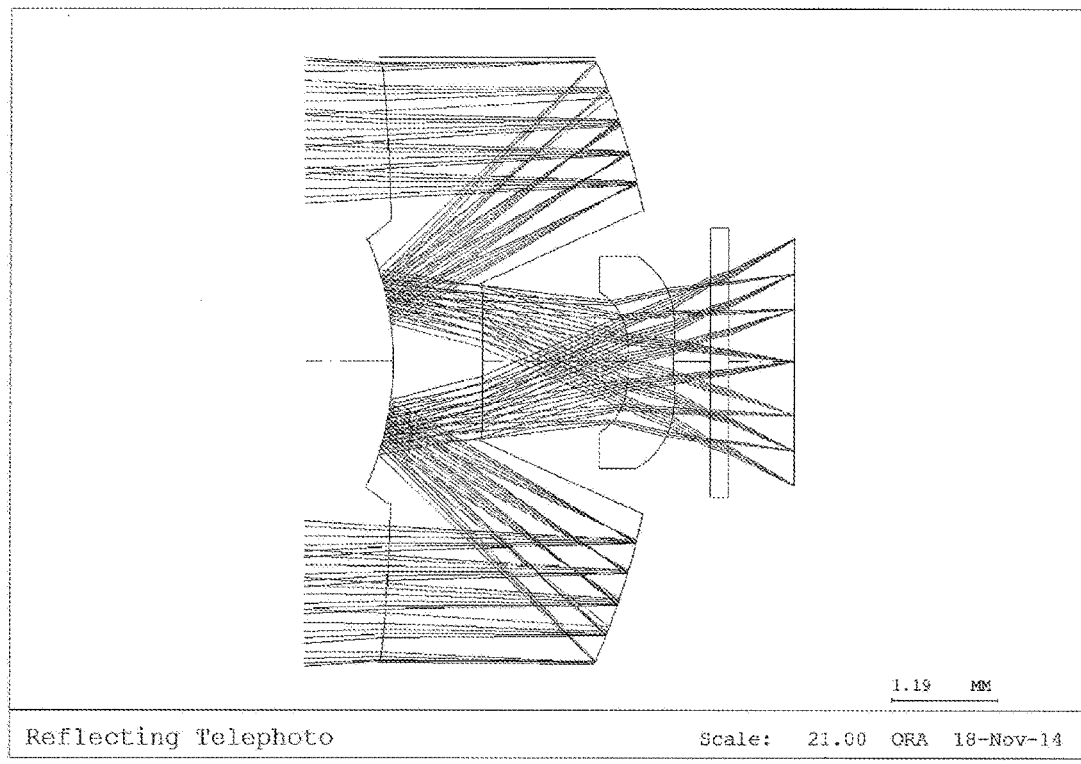
FIG. 2 is a diagram illustrating the first exemplary embodiment according to the iris recognition lens system of the present invention.

FIG. 2 is a diagram illustrating a first exemplary embodiment according to the iris recognition lens system of the present invention.

As illustrated in FIG. 2, a first lens is disposed on an optical axis at a predetermined distance from an object, and a second lens compensating for imaging is additionally disposes at a position facing a transmitting area of a rear part of the first lens.

Table 1 below presents data about the lens constituting an optical system according to the first embodiment of the present invention.

TABLE 1

| Surface No. | RDY[1] | THI (thickness) | Nd[2] | Vd[3] | R/T[4] |
|---|---|---|---|---|---|
| OBJ | INFINITY | 250 | | | |
| 1 | INFINITY | TTL/f < 0.5082369 | AIR | | |
| 2 | −80.25496 | 3 | 1.531 | 55.8 | T[5] |
| STO | −8.14847 | −2.99424 | 1.531 | 55.8 | R[6] |
| 4 | −3.09051 | 1 | 1.531 | 55.8 | R[6] |
| 5 | −8240.77038 | 1.650175 | Air | | |
| 6 | −2.83473 | 0.5 | 1.531 | 55.8 | T[5] |
| 7 | 5.48948 | 0.414821 | Air | | |
| 8 | INFINITY | 0.2 | BSC7_HOYA | | T[5] |
| 9 | INFINITY | 0.739662 | | | |
| IMG | INFINITY | −0.003 | | | |

Notes)
RDY[1]: RDY (radius of curvature),
Nd[2]: Nd (refractive index),
Vd[3]: Vd (Abbe number),
R/T[4]: Reflection/Transmission,
T[5]: Transmission,
R[6]: Reflection
(OBJ: Surface of object, STO: Iris diaphragm, IMG: imaging surface, Infinity: plane)

As illustrated in FIG. 2, the first lens (a second surface, an STO, a fourth surface and a fifth surface), the second lens (a sixth surface and a seventh surface), an optical filter OF (an eighth surface, a ninth surface) are disposed sequentially from the object. When the direction of the optical axis is set X and the direction perpendicular to the optical axis is set Y, an aspherical equation is as follows:

$$X(Y) = \frac{Y^2}{R} = \frac{1}{1+\sqrt{1-(1+K)\left(\frac{Y}{R}\right)^2}} + \qquad [\text{Formula 1}]$$

$$AY^4 + BY^6 + CY^8 + DY^{10} + EY^{12} + FY^{14}$$

where an aspherical surface is a curved surface produced by rotating a curved line obtained from the aspherical equation of Formula 1 around the optical axis, R is a radius of curvature, K is a conic constant, and A, B, C, D, E, and F are aspherical coefficients.

Aspherical coefficients having data of each of the above-mentioned lenses obtained from Formula 1 are presented in Table 2 below.

TABLE 2

|    | K          | A           | B           | C           | D           |
|----|------------|-------------|-------------|-------------|-------------|
| s2 | 0.00000E+00 | −5.84788E−04 | 1.74139E−05  | −1.76378E−07 | −6.18046E−08 |
| s3 | 0.00000E+00 | 1.57616E−04  | 4.33592E−06  | −3.92504E−08 | −1.22178E−08 |
| s4 | 0.00000E+00 | 1.81915E−02  | −1.47622E−03 | −1.37894E−03 | −5.09202E−05 |
| s5 | 0.00000E+00 | 1.28621E−03  | −1.31321E−02 | −2.72823E−02 | 1.19168E−02  |
| s6 | 0.00000E+00 | −4.64043E−01 | 8.75285E−02  | −1.92269E−01 | −1.59550E−01 |
| s7 | 0.00000E+00 | −3.72010E−01 | 2.06789E−01  | −1.45199E−01 | 3.82945E−02  |

Table 3 below presents the angle of view, height of image, focal length f, TTL, and TTL/f of the lens system according to the first embodiment. A high-performance iris recognition lens system with the focal length being at least two times the length of the entire lens system can be provided.

TABLE 3

| Angle of view   | 9.4°    |
| Height of image | 1.39 mm |
| Focal length (f)| 12.5 mm |
| TTL             | 4.8 mm  |
| TTL/f           | 0.38    |

When referring to FIG. 1, in the first lens according to the first embodiment, H2 at a height corresponding to 90% of the effective diameter of the front part of the first lens is 2.95 mm, ang3 39.7°, ang4 is 9.4°, and ang3/ang4 is 4.2.

Figure 3:
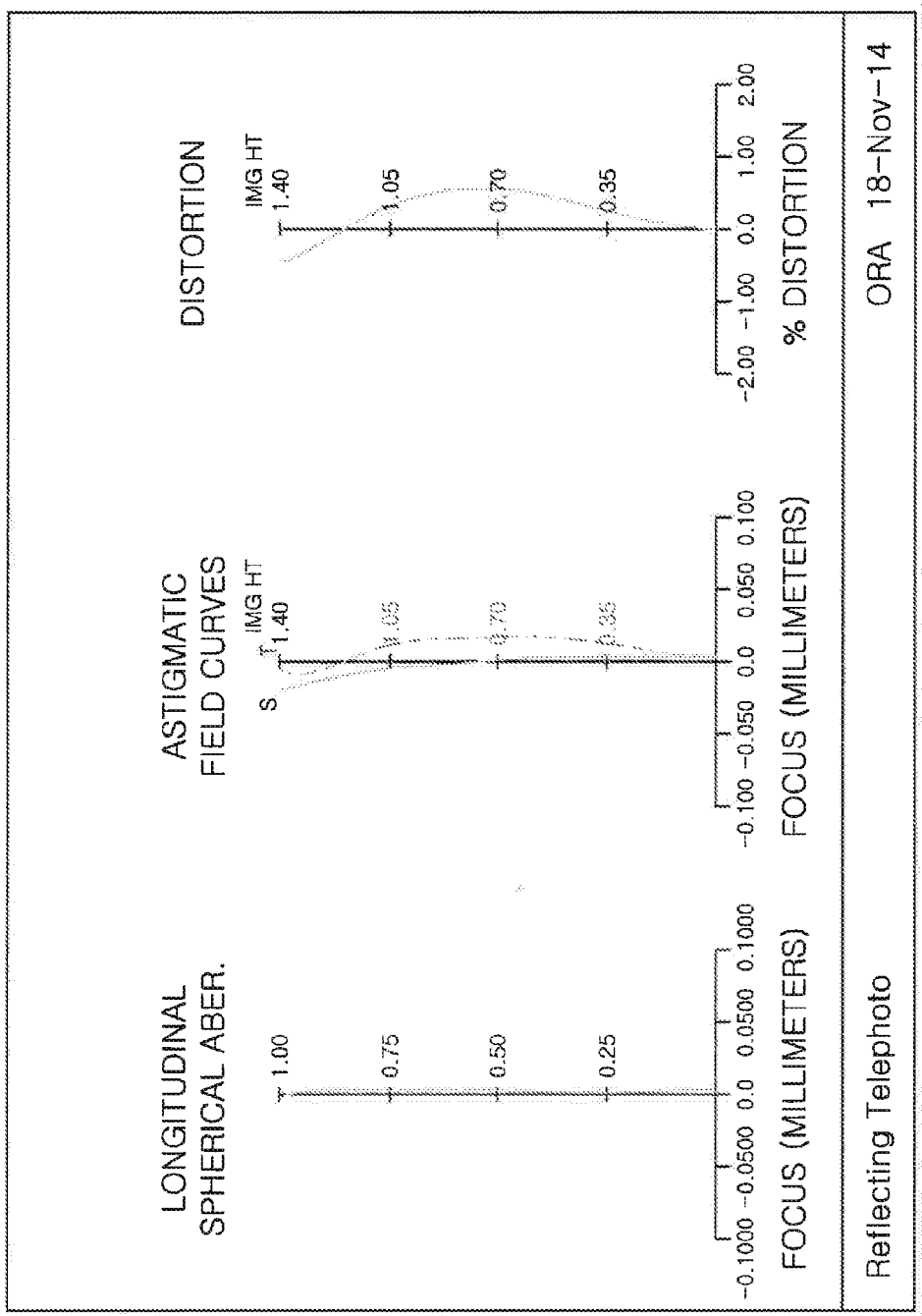
FIG. 3 illustrates an aberration diagram according to the first exemplary embodiment of the present invention.

FIG. 3 is a diagram illustrating an aberration according to the first exemplary embodiment of the present invention.

Referring to FIG. 3, first data indicates spherical aberration, in which the vertical axis indicates a height of image (mm), the horizontal axis indicates a focus (mm) of each height of image, and the color of the graphs indicates the wavelength of incident light. As illustrated, it is known that the ability to correct spherical aberration is better as the graphs are closer to the central vertical axis and to each other. It is determined that the first embodiment of the present invention has a fine spherical aberration of 0.025 mm or less (focus).

Second, data in FIG. 3 indicates astigmatism, in which the vertical axis indicates a height of image (mm), the horizontal axis indicates a focus (mm) of each height of image, graph S indicates sagittal light, i.e. a ray of light entering in the direction perpendicular to the ground, and graph T indicates tangential light, i.e. a ray of light entering in the direction parallel to the ground. It is known that the ability to correct astigmatism is better as the graphs S and T are closer to each other and to the central vertical axis. It is determined that the first embodiment of the present invention has a fine spherical aberration of 0.025 mm or less (focus).

Third data in FIG. 3 indicates distortion, in which the horizontal axis indicates a degree of distortion (%), and the vertical axis indicates a focus (mm) of a height of image. It is known that an aberration curve ranging from −2 to 2% is desirable. From the distortion according to the first embodiment of the present invention, it is appreciated that the optical distortion is 1% or less, and that distortion correction ability is considerably good.

Second Embodiment

Figure 4:
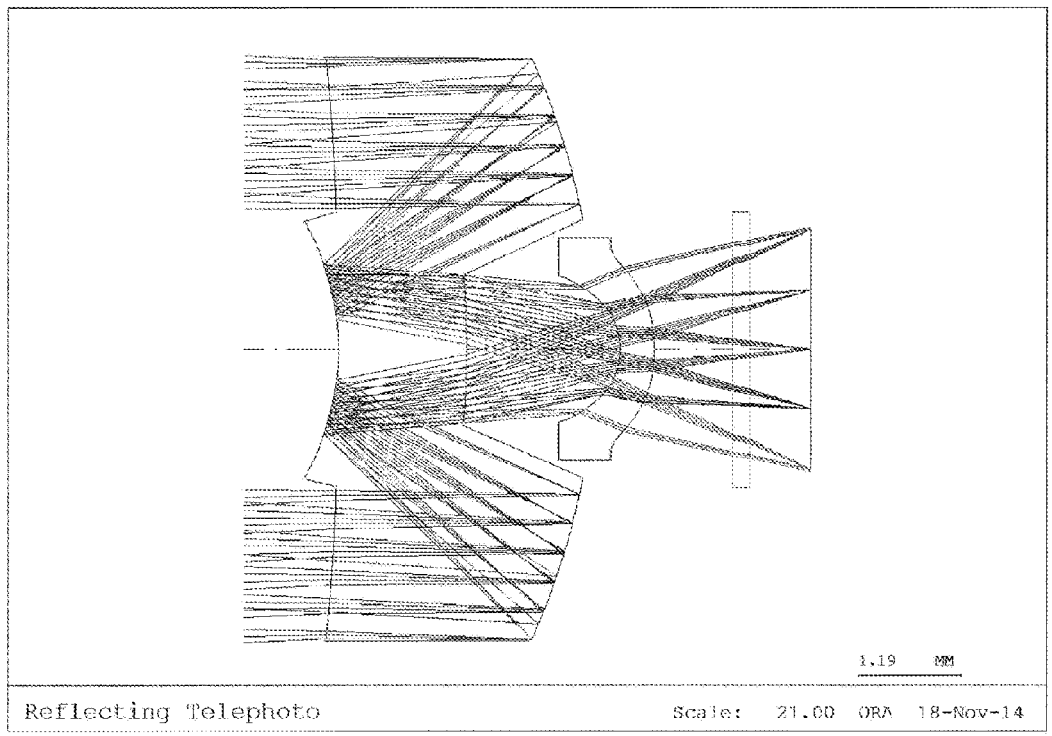
FIG. 4 is a schematic view illustrating a second exemplary embodiment according to the iris recognition lens system of the present invention.

FIG. 4 is a schematic view illustrating a second exemplary embodiment according to the iris recognition lens system of the present invention.

As illustrated in FIG. 4, a first lens is disposed on an optical axis at a predetermined distance from an object, and a second lens compensating for imaging is additionally disposed at a position facing a transmitting area of a rear part of the first lens.

Table 4 below presents data about the lens constituting an optical system according to the second embodiment of the present invention.

TABLE 4

| Surface No. | RDY[1]    | THI (thickness) | Nd[2]     | Vd[3] | R/T[4] |
|-------------|-----------|-----------------|-----------|-------|--------|
| OBJ         | INFINITY  | 250             |           |       |        |
| 1           | INFINITY  | 0.482369        | AIR       |       |        |
| 2           | −82.91764 | 3               | 1.531     | 55.8  | T[5]   |
| STO         | −8.03947  | −2.99424        | 1.531     | 55.8  | R[6]   |
| 4           | −2.78039  | 1.5             | 1.531     | 55.8  | R[6]   |
| 5           | −25.60729 | 1.788945        | Air       |       |        |
| 6           | −0.85986  | 0.4             | 1.531     | 55.8  | T[5]   |
| 7           | −2.05257  | 0.90144         | Air       |       |        |
| 8           | INFINITY  | 0.2             | BSC7_HOYA |       | T[5]   |
| 9           | INFINITY  | 0.719449        |           |       |        |
| IMG         | INFINITY  | −0.003          |           |       |        |

Notes)
RDY[1]: RDY (radius of curvature),
Nd[2]: Nd (refractive index),
Vd[3]: Vd (Abbe number),
R/T[4]: Reflection/Transmission,
T[5]: Transmission,
R[6]: Reflection
(OBJ: Surface of object, STO: Iris diaphragm, IMG: imaging surface, Infinity: plane)

As illustrated in FIG. 4, the first lens (a second surface, an STO, a fourth surface and a fifth surface), the second lens (a sixth surface and a seventh surface), an optical filter OF (an eighth surface, a ninth surface) are disposed sequentially from the object. When the direction of the optical axis is set X and the direction perpendicular to the optical axis is set Y, an aspherical equation is as Formula 1 above.

In Formula 1 above, an aspherical surface is a curved surface produced by rotating a curved line obtained from the aspherical equation of Formula 1 around the optical axis, R is a radius of curvature, K is a conic constant, and A, B, C, D, E, and F are aspherical coefficients.

Aspherical coefficients having data of each of the above-mentioned lenses obtained from Formula 1 are presented in Table 5 below.

TABLE 5

|    | K           | A            | B           | C            | D           |
|----|-------------|--------------|-------------|--------------|-------------|
| s2 | 0.00000E+00 | −8.94447E−04 | 5.10221E−05 | −1.78531E−06 | 2.68219E−08 |
| s3 | 0.00000E+00 | 7.19006E−05  | 1.02366E−05 | −2.59603E−07 | 3.12520E−09 |
| s4 | 0.00000E+00 | 1.06253E−02  | 5.12413E−03 | −3.96399E−03 | 7.57315E−04 |
| s5 | 0.00000E+00 | −3.49773E−02 | 6.22177E−03 | −2.78578E−02 | 1.25937E−02 |
| s6 | 0.00000E+00 | −3.44407E−01 | 4.48288E−01 | −9.80026E−01 | 1.48774E+00 |
| s7 | 0.00000E+00 | −2.54258E−01 | 1.73430E−01 | −1.29887E−01 | 7.14129E−02 |

Table 6 below presents the angle of view, height of image, focal length f, TTL, and TTL/f of the lens system according to the second embodiment. A high-performance iris recognition lens system with the focal length being at least two times the length of the entire lens system can be provided.

TABLE 6

| Angle of view   | 6.8°    |
| Height of image | 1.4 mm  |
| Focal length (f)| 15 mm   |
| TTL             | 5.84 mm |
| TTL/f           | 0.39    |

When referring to FIG. 1, in the first lens according to the second embodiment, H2 at a height corresponding to 90% of the effective diameter of the front part of the first lens is 2.96 mm, ang3 is 40.7°, ang4 is 7.3°, and ang/ang4 is 5.6.

FIG. is a diagram illustrating an aberration according to the second exemplary embodiment of the present invention.

Referring to FIG. first data indicates spherical aberration, in which the vertical axis indicates a height of image (mm), the horizontal axis indicates a focus (mm) of each height of image, and the colors of the graphs indicate the wavelengths of incident light. As illustrated, it is known that the ability to correct spherical aberration is better as the graphs are closer to the central vertical axis and to each other. It is determined that the second embodiment of the present invention has a fine spherical aberration of 0.025 mm or less (focus).

Figure 5:
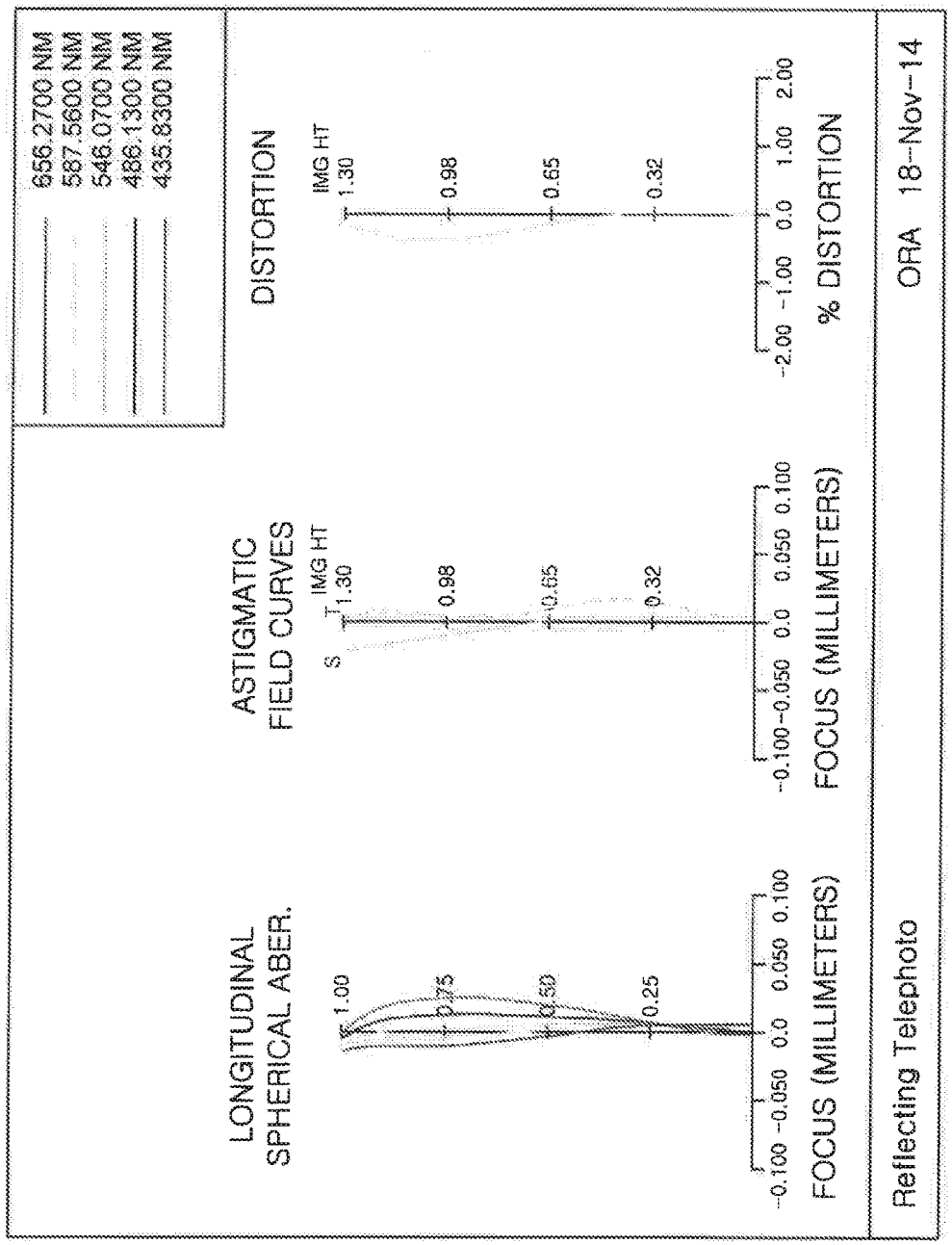
FIG. 5 illustrates an aberration diagram according to the second exemplary embodiment of the present invention.

Second data in FIG. 5 indicates astigmatism, in which the vertical axis indicates a height of image (mm), the horizontal axis indicates a focus (mm) of each height of image, graph S indicates sagittal light, i.e. a ray of light entering in the direction perpendicular to the ground, and graph T indicates tangential light, i.e. a ray of light entering in the direction parallel to the ground. It is known that the ability to correct astigmatism is better as the graphs S and T are closer to each other and to the central vertical axis. It is determined that the second embodiment of the present invention has a fine spherical aberration of 0.025 mm or less (focus).

Third data in FIG. 5 indicates distortion, in which the horizontal axis indicates a degree of distortion (%), and the vertical axis indicates a focus (mm) of a height of image. It is known that an aberration curve ranging from −2 to 2% is desirable. From the distortion according to the second embodiment of the present invention, is appreciated that the optical distortion is 1% or less, and that distortion correction ability is considerably good.

Third Embodiment

Figure 6:
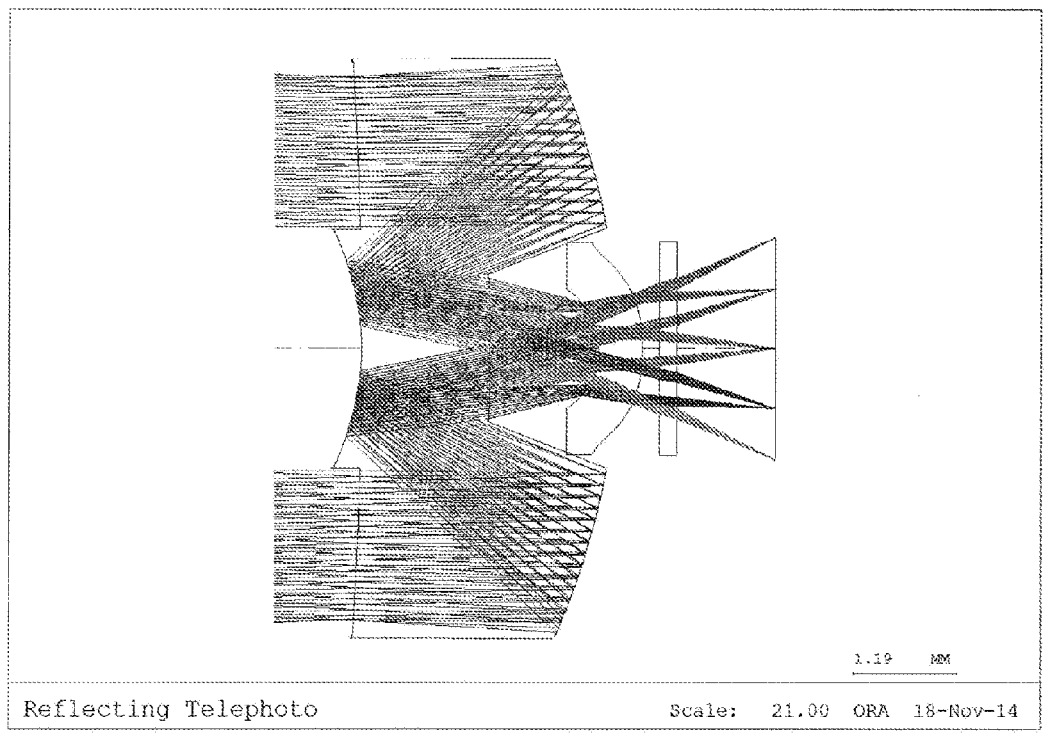
FIG. 6 is a schematic view illustrating a third exemplary embodiment according to the iris recognition lens system of the present invention.

FIG. 6 is a schematic view illustrating a third exemplary embodiment according to the iris recognition lens system of the present invention.

As illustrated in FIG. 6, a first lens is disposed on an optical axis at a predetermined distance from an object, and a second lens compensating for imaging is additionally disposed at a position facing a transmitting area of a rear part of the first lens.

Table 7 below presents data about the lens constituting an optical system according to the third embodiment of the present invention.

TABLE 7

| Surface No. | RDY[1]    | THI (thickness) | Nd[2]     | Vd[3] | R/T[4] |
|-------------|-----------|-----------------|-----------|-------|--------|
| OBJ         | INFINITY  | 250             |           |       |        |
| 1           | INFINITY  | 0.482369        | AIR       |       |        |
| 2           | −87.16477 | 3               | 1.531     | 55.8  | T[5]   |
| STO         | −7.89313  | −2.99424        | 1.531     | 55.8  | R[6]   |
| 4           | −2.66669  | 1.5             | 1.531     | 55.8  | R[6]   |
| 5           | −708.62504| 1.28214         | air       |       |        |
| 6           | −0.93239  | 0.5             | 1.531     | 55.8  | T[5]   |
| 7           | −2.4082   | 0.198294        | air       |       |        |
| 8           | INFINITY  | 0.2             | BSC7_HOYA |       | T[5]   |
| 9           | INFINITY  | 1.171931        |           |       |        |
| IMG         | INFINITY  | −0.003          |           |       |        |

Notes:
RDY[1]: RDY (radius of curvature),
Nd[2]: Nd (refractive index),
Vd[3]: Vd (Abbe number),
R/T[4]: Reflection/Transmission,
T[5]: Transmission,
R[6]: Reflection
(OBJ: Surface of object, STO: Iris diaphragm, IMG: imaging surface, Infinity: plane)

As illustrated in FIG. 6, the first lens (a second surface, an STO, a fourth surface and a fifth surface), the second lens (a sixth surface and a seventh surface), an optical filter OF (an eighth surface, a ninth surface) are disposed sequentially from the object. When the direction. of the optical axis is set X and the direction perpendicular to the optical axis is set Y, an aspherical equation is as Formula 1 above.

In Formula 1, an aspherical surface is a curved surface produced by rotating a curved line obtained from the aspherical equation of Formula 1 around the optical axis, R is a radius of curvature, K is a conic constant, and A, B, C, D, E, and F are aspherical coefficients.

Aspherical coefficients having data of each of the above-mentioned lenses obtained from Formula 1 are presented in Table 8 below.

TABLE 8

|    | K | A | B | C | D |
|---|---|---|---|---|---|
| s2 | 0.00000E+00 | −4.29964E−04 | 2.46195E−05 | −5.04219E−07 | −5.89745E−08 |
| s3 | 0.00000E+00 | 2.07443E−04 | 5.81400E−06 | 1.66055E−08 | −1.64183E−08 |
| s4 | 0.00000E+00 | 2.71089E−02 | −3.05819E−04 | −3.11957E−03 | 4.26787E−04 |
| s5 | 0.00000E+00 | 1.40824E−02 | −2.17048E−02 | −7.26781E−02 | 3.75238E−02 |
| s6 | 0.00000E+00 | −2.49028E−01 | 2.30129E−01 | −1.07488E+00 | 8.47561E−01 |
| s7 | 0.00000E+00 | −1.76071E−01 | 1.08090E−01 | −1.66337E−01 | 8.38103E−02 |

Table 9 below presents the angle of view, height of image, focal length f, TTL, and TTL/f of the lens system according to the third embodiment. A high-performance iris recognition lens system with the focal length being at least two times the length of the entire lens system can be provided.

TABLE 9

| Angle of view | 7.2° |
|---|---|
| Height of image | 1.3 mm |
| Focal length (f) | 14 mm |
| TTL | 5.18 mm |
| TTL/f | 0.37 |

When referring to FIG. 1, in the first lens according to the third embodiment, H2 at a height corresponding to 90% of the effective diameter of the front part of the first lens is 2.88 mm, ang3 is 39.6°, ang4 is 9.2°, and ang3/ang4 is 4.3.

Figure 7:
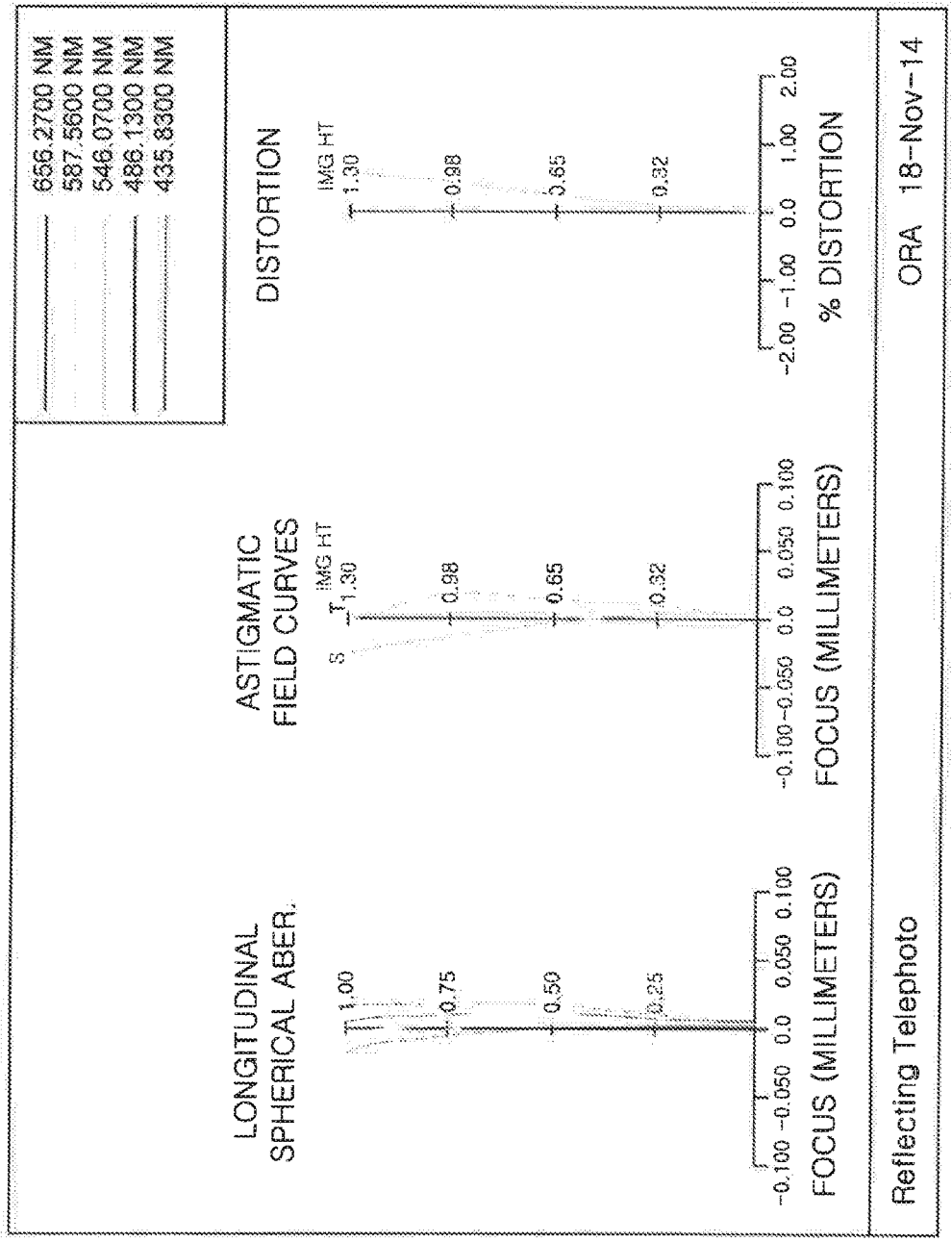
FIG. 7 illustrates an aberration diagram according to the third exemplary embodiment of the present invention.

FIG. 7 is a diagram illustrating an aberration according to the third exemplary embodiment of the present invention.

Referring to FIG. 7, first data indicates spherical aberration, in which the vertical axis indicates a height of image (mm), the horizontal axis indicates a focus (mm) of each height of image, and the color of the graphs indicates the wavelength of incident light. As illustrated, it is known that the ability to correct spherical aberration is better as the graphs are closer to the central vertical axis and to each other. It is determined that the third embodiment of the present invention has a fine spherical aberration of 0.025 mm or less (focus).

Second data in FIG. 7 indicates astigmatism, in which the vertical axis indicates a height of image (mm), the horizontal axis indicates a focus (mm) of each height of image, grape S indicates sagittal light, i.e. a ray of light entering in the direction perpendicular to the ground, and graph T indicates tangential light, i.e. a ray of light. entering in the direction parallel to the ground. It is known that the ability to correct astigmatism is better as the graphs S and T are closer to each other and to the central vertical axis. It is determined that the third embodiment of the present invention has a fine spherical aberration of 0.025 mm or less (focus).

Third data in FIG. 7 indicates distortion, in which the horizontal axis indicates a degree of distortion (%), and the vertical axis indicates a focus (mm) of a height of image. It is known that an aberration curve ranging from −2 to 2% is desirable. From the distortion according to the third embodiment of the present invention, it is appreciated that the optical distortion is 1% or less, and that distortion correction ability is considerably good.

Fourth Embodiment

Figure 8:
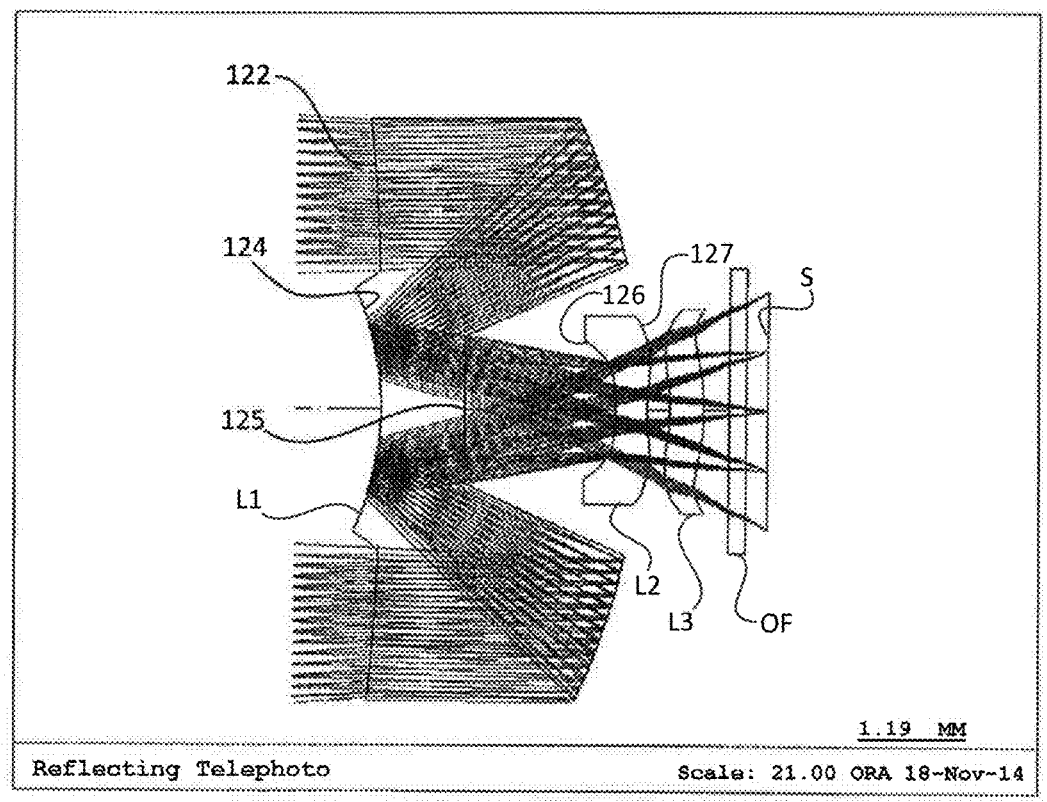
FIG. 8 is a schematic view illustrating a fourth exemplary embodiment according to the iris recognition lens system of the present invention.

FIG. 8 is a schematic view illustrating a fourth exemplary embodiment according to the iris recognition lens system of the present invention.

As illustrated in FIG. 8, a first lens L1 is disposed on an optical axis at a predetermined distance from an object, and a second lens L2 compensating for imaging and one rear lens L3 are additionally disposed facing a transmitting area of a rear part of the first lens.

Table 10 below presents data about the lens constituting an optical system according to the fourth embodiment of the present invention.

TABLE 10

| Surface No. | RDY[1] | THI (thickness) | Nd[2] | Vd[3] | R/T[4] |
|---|---|---|---|---|---|
| OBJ | INFINITY | 250 | | | |
| 1 | INFINITY | 0.482369 | AIR | | |
| 2 | −80.25496 | 3 | 1.531 | 55.8 | T[5] |
| STO | −8.14847 | −3 | 1.531 | 55.8 | R[6] |
| 4 | −3.09051 | 1 | 1.531 | 55.8 | R[6] |
| 5 | −8240.77038 | 1.7014 | air | | |
| 6 | −6.91422 | 0.367171 | 1.531 | 55.8 | T[5] |
| 7 | 2.29258 | 0.263221 | air | | |
| 8 | −2.10241 | 0.4 | 1.531 | 55.8 | T[5] |
| 9 | −2.22302 | 0.3 | | | |
| 10 | INFINITY | 0.2 | BSC7_HOYA | | T[5] |
| 11 | INFINITY | 0.242072 | | | |
| IMG | INFINITY | 0.007933 | | | |

Notes)
RDY[1]: RDY (radius of curvature),
Nd[2]: Nd (refractive index),
Vd[3]: Vd (Abbe number),
R/T[4]: Reflection/Transmission,
T[5]: Transmission,
R[6]: Reflection
(OBJ: Surface of object, STO: Iris diaphragm, IMG: imaging surface, Infinity: plane)

As illustrated in FIG. 8, the first lens L1 (a second surface 122, an STO, a fourth surface 124 and a fifth surface 125), the second lens L2 (a sixth surface 126 and a seventh surface 127), the rear lens L3 (an eighth surface and a ninth surface), an optical filter OF (a tenth surface, an eleventh surface) are disposed sequentially from the object. When the direction of the optical axis is set X and the direction perpendicular to the optical axis is set Y, an aspherical equation is as Formula 1 above.

In Formula 1, an aspherical surface is a curved surface produced by rotating a curved line obtained from the aspherical equation of Formula 1 around the optical axis, R is a radius of curvature, K is a conic constant, and A, B, C, E, and F are aspherical coefficients.

Aspherical coefficients having data of each of the above-mentioned lenses obtained from Formula 1 are presented in Table 11 below.

TABLE 11

|  | K | A | B | C | D |
|---|---|---|---|---|---|
| s2 | 0.00000E+00 | −5.84788E−04 | 1.74139E−05 | −1.76378E−07 | −6.18046E−08 |
| s3 | 0.00000E+00 | 1.57616E−04 | 4.33592E−06 | −3.92504E−08 | −1.22178E−08 |
| s4 | 0.00000E+00 | 1.81915E−02 | −1.47622E−03 | −1.37894E−03 | −5.09202E−05 |
| s5 | 0.00000E+00 | 1.28621E−03 | −1.31321E−02 | −2.72823E−02 | 1.19168E−02 |
| s6 | 0.00000E+00 | −6.48531E−01 | −1.29005E−01 | −1.29166E−01 | 2.00471E−01 |
| s7 | 0.00000E+00 | −4.61947E−01 | 1.71920E−01 | −1.32810E−02 | −1.06120E−02 |
| s8 | 0.00000E+00 | 2.90959E−01 | −2.58501E−02 | −1.29675E−02 | 6.71501E−03 |
| s9 | 0.00000E+00 | 6.11891E−02 | 8.39769E−02 | 4.54155E−03 | −5.79719E−03 |

Table 12 below presents the angle of view, height of image, focal length f, TTL, and TTL/f of the lens system according to the fourth embodiment. A high-performance iris recognition lens system with the focal length being at least two times the length of the entire lens system can be provided.

TABLE 12

| Angle of view | 9.4° |
|---|---|
| Height of image | 1.4 mm |
| Focal length (f) | 12.5 mm |
| TTL | 4.78 mm |
| TTL/f | 0.38 |

When referring to FIG. 1, in. the first lens according to the fourth embodiment, H2 at a height corresponding to 90% of the effective diameter of the front part of the first lens is 2.95 mm, ang3 is 39.7°, ang4 is 9.5°, and ang3/ang4 is 4.2.

Figure 9:
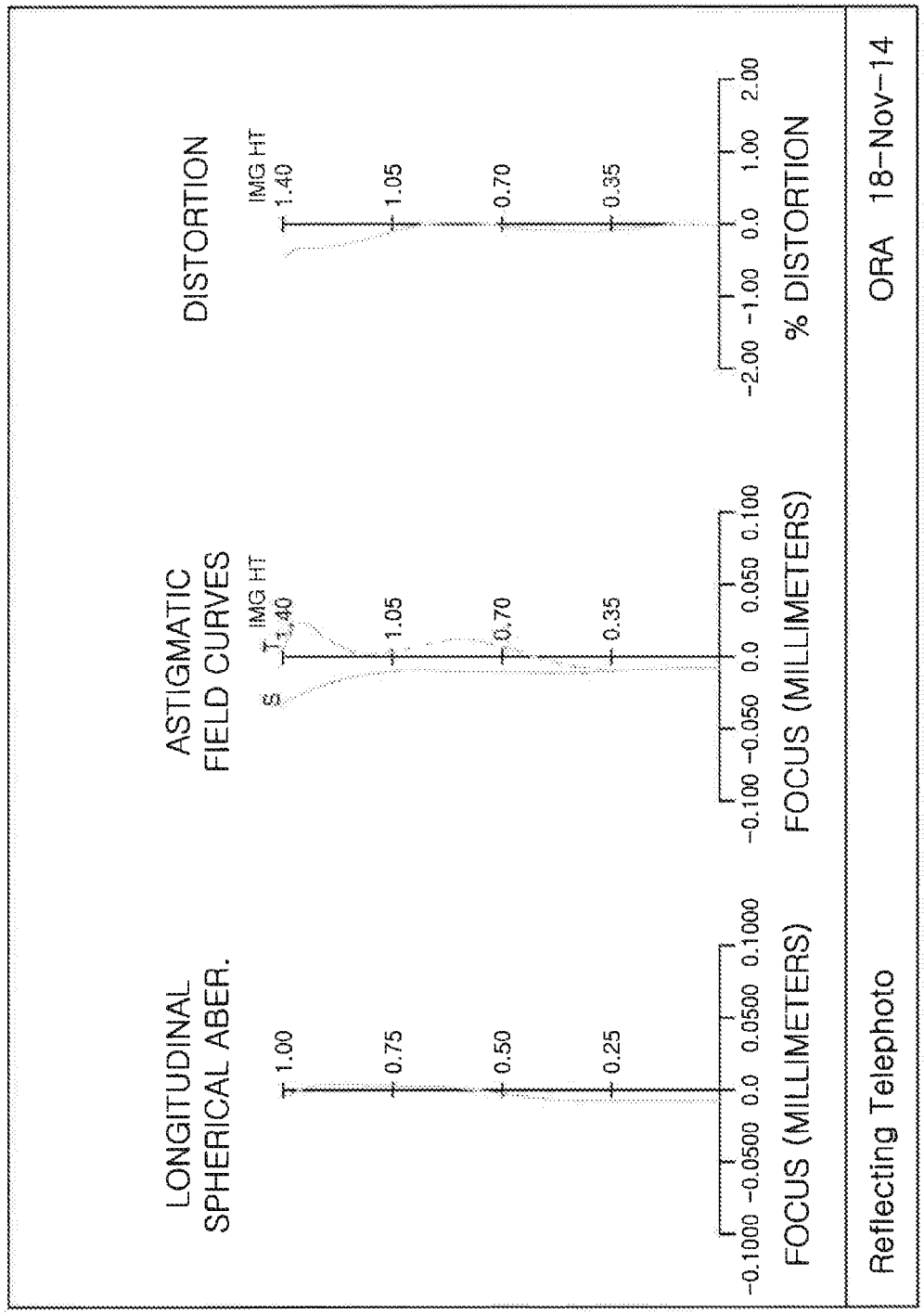
FIG. 9 illustrates an aberration diagram according to the fourth exemplary embodiment of the present invention.

FIG. 9 is a diagram illustrating an aberration according to the fourth exemplary embodiment of the present invention.

Referring to FIG. 9, first data indicates spherical aberration, in which the vertical axis indicates a height of image (mm), the horizontal axis indicates a focus (mm) of each height of image, and the color of the graphs indicates the wavelength of incident light. As illustrated, it is known that the ability to correct spherical aberration is better as the graphs are closer to the central vertical axis and to each other. It is determined that the fourth embodiment of the present invention has a fine spherical aberration of 0.025 mm or less (focus).

Second data in FIG. 9 indicates astigmatism, in which the vertical axis indicates a height of image (mm), the horizontal axis indicates a focus (mm) of each height of image, graph S indicates sagittal light, i.e. a ray of light entering in the direction perpendicular to the ground, and graph T indicates tangential light, i.e. a ray of light entering in the direction parallel to the ground. It is known that the ability to correct astigmatism is better as the graphs S and T are closer to each other and to the central vertical axis. It is determined that the fourth embodiment of the present invention has a fine spherical aberration of 0.025 mm or less (focus) except for 0.9 of the field or greater, Third data in FIG. 9 indicates distortion, in which the horizontal axis indicates a degree of distortion (%), and vertical axis indicates a focus (mm) of a height of image. It is known What an aberration curve ranging from −2 to 2% is desirable. From the distortion according to the second embodiment of the present invention, it is appreciated that the optical distortion is 1% or less except for 0.9 of the field or greater, and that distortion correction ability is considerably good.

As set forth above, the iris recognition lens system according to embodiments of the invention has a plurality of reflecting areas and a plurality of transmitting areas in a single lens. The geometry and dimensions of the reflecting areas and the transmitting areas are defined to provide a focal length such that the ratio of the total optical track length (TTL) with respect to focal length f is smaller than 0.50 (TTL/f<0.50), wherein a small but high-definition recognition lens system can be provided.

In particular, the lens is designed such that, in light bundles emit ted from an object on the optical axis, a ray of light propagating at a height corresponding to 90% of the effective diameter is directed satisfying the following relationship: |ang3|>|ang4|×2, where ang3 indicates the angle of light reflected from the reflecting area of the rear part with respect to the optical axis, and ang4 indicates the angle of light reflected from the reflecting area of the front part with respect to the optical axis. The iris recognition lens system has an increased focal length while having superior spherical aberration, astigmatism, and distortion, which lead to superior imaging performance and high definition.

Although the exemplary embodiments of the present invention have been described for illustrative purposes, those skilled in the art will appreciate that various modifications, additions and substitutions are possible, without departing from the scope and spirit of the present invention as disclosed in the accompanying claims.

What is claimed is:

1. An iris recognition lens system comprising:
a first lens and a second lens disposed on an optical axis and sequentially from an object to take an image of an iris and a pupil, wherein:
a front part of the first lens comprises a reflecting area in a central portion and a transmitting area in a circumferential portion,
a rear part of the first lens comprises a concave transmitting area in a central portion and a reflecting area in a circumferential portion, and
the second lens is disposed at a rear of the transmitting area in the central portion of the rear part of the first lens.

2. The iris recognition lens system according to claim 1, wherein the reflecting area in the front part of the first lens is concave in a direction toward the object.

3. The iris recognition lens system according to claim 1, wherein an inner diameter of the reflecting area in the rear part of the first lens is greater than. an outer diameter of the transmitting area in the rear part of the first lens.

4. The iris recognition lens system according to claim 1, wherein the transmitting area and the reflecting area in the rear part of the first lens are connected to each other via an inclined surface extending from an inner diameter of the reflecting area to an outer diameter of the transmitting area.

5. The iris recognition lens system according to claim 4, wherein the inclined surface is shaped to converge forward about the optical axis.

6. The iris recognition lens system according to claim 4, wherein the inclined surface is provided with a light-blocking means.

7. The iris recognition lens system according to claim 4, wherein the inclined surface has a stepped shape.

8. The iris recognition lens system according to claim 1, wherein, in light bundles emitted from the object on the optical axis, a ray of light propagating at a height corresponding to 90% of an effective diameter is directed satisfying the following relationship: |ang3|>|ang4|×2, where ang3 indicates an angle of light reflected from the reflecting area in the rear part with respect to the optical axis, and ang4 indicates an angle of light reflected from the reflecting area in the front part with. respect to the optical axis.

9. The iris recognition lens system according to claim 1, wherein a focal length f of the iris recognition lens system is defined by the relationship: TTL/f<0.50 is satisfied, where TTL is a total optical track length or a length from a summit of a front surface of the first lens to an imaging surface, and f is a focal length.

10. The iris recognition lens system according to claim 1, wherein the first lens and the second lens are formed of a plastic material.

11. The iris recognition lens system according to claim 1, further comprising one rear lens arranged on the optical axis at a rear of the second lens.

12. The iris recognition lens system according to claim 11, wherein the rear lens is formed of a plastic material, at least one surface of the rear lens forming an aspheric lens.

* * * * *